United States Patent
Kim et al.

(10) Patent No.: US 10,772,038 B2
(45) Date of Patent: *Sep. 8, 2020

(54) METHOD WHEREBY TERMINAL SELECTS PLMN IN WIRELESS COMMUNICATION SYSTEM, AND DEVICE FOR SAME

(71) Applicant: LG ELECTRONICS INC., Seoul (KR)

(72) Inventors: Taehun Kim, Seoul (KR); Jaehyun Kim, Seoul (KR); Jinsook Ryu, Seoul (KR); Hyunsook Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,650

(22) Filed: Sep. 13, 2019

(65) Prior Publication Data

US 2020/0008140 A1   Jan. 2, 2020

Related U.S. Application Data

(63) Continuation of application No. 15/545,443, filed as application No. PCT/KR2016/001155 on Feb. 2, 2016, now Pat. No. 10,455,491.

(Continued)

(51) Int. Cl.
*H04L 12/28* (2006.01)
*H04W 48/18* (2009.01)
(Continued)

(52) U.S. Cl.
CPC ............. *H04W 48/18* (2013.01); *H04L 67/16* (2013.01); *H04L 67/18* (2013.01); *H04W 4/023* (2013.01);
(Continued)

(58) Field of Classification Search
CPC ..................................................... H04L 12/28
(Continued)

(56) References Cited

U.S. PATENT DOCUMENTS 9,930,591 B2   3/2018 Won et al.
2019/0319868 A1*  10/2019 Svennebring ....... H04L 43/0882

FOREIGN PATENT DOCUMENTS

KR   10-2011-0091305 A   8/2011
KR   10-2012-0018738 A   3/2012
(Continued)

*Primary Examiner* — Dang T Ton
(74) *Attorney, Agent, or Firm* — Birch, Stewart, Kolasch & Birch, LLP

(57) ABSTRACT

A method for a User Equipment (UE) in a wireless communication system, the includes transmitting, by the UE which is outside of coverage, a first message for registration to a first cell on a selected first Public Land Mobile Network (PLMN), wherein the first PLMN which is not included in a list related to forbidden PLMNs; receiving, by the UE, a second message related to registration failure with the first PLMN; selecting, by the UE, a second PLMN; and transmitting, by the UE, a third message for registration to a second cell on the selected second PLMN, wherein zero or more PLMNs, which are included in the list related to forbidden PLMNs, are excluded in a selection of the second PLMN, and wherein the first PLMN with which the registration has failed is further excluded in the selection of the second PLMN, although the first PLMN is not included in the list related to forbidden PLMNs.

8 Claims, 6 Drawing Sheets

Related U.S. Application Data

(60) Provisional application No. 62/112,069, filed on Feb. 4, 2015, provisional application No. 62/130,628, filed on Mar. 10, 2015, provisional application No. 62/143,231, filed on Apr. 6, 2015.

(51) Int. Cl.
| | |
|---|---|
| *H04W 60/00* | (2009.01) |
| *H04L 29/08* | (2006.01) |
| *H04W 4/02* | (2018.01) |
| *H04W 48/02* | (2009.01) |
| *H04W 88/06* | (2009.01) |
| *H04W 84/04* | (2009.01) |

(52) U.S. Cl.
CPC ............ *H04W 60/00* (2013.01); *H04W 48/02* (2013.01); *H04W 84/042* (2013.01); *H04W 88/06* (2013.01)

(58) Field of Classification Search
USPC .......................................................... 370/329
See application file for complete search history.

(56) References Cited

FOREIGN PATENT DOCUMENTS

| KR | 10-2014-0088211 A | 7/2014 |
|---|---|---|
| KR | 10-2014-0146819 A | 12/2014 |
| WO | WO 2014/133356 A1 | 9/2014 |

\* cited by examiner

METHOD WHEREBY TERMINAL SELECTS PLMN IN WIRELESS COMMUNICATION SYSTEM, AND DEVICE FOR SAME

CROSS-REFERENCE TO RELATED APPLICATIONS

This Application is a Continuation of U.S. patent application Ser. No. 15/545,443 filed on. Jul. 21, 2017 (now U.S. Pat. No. 10,455,491 issued on Oct. 22, 2019), which is a Continuation of the National Phase of PCT International Application No. PCT/KR2016/001155, filed on Feb. 2, 2016, which claims priority under 35 U.S.C. 119(e) to U.S. Provisional Application No. 62/112,069, filed on Feb. 4, 2015, No. 62/130,628, filed on Mar. 10, 2015, and No. 62/143,231, filed on Apr. 6, 2015, all of these applications are hereby expressly, incorporated by reference into the present application.

BACKGROUND OF THE INVENTION

Field of the Invention

The present disclosure relates to a wireless communication system, and more particularly, to a method and apparatus for performing Public Land Mobile Network (PLMN) selection related to Proximity-based Service (ProSe) direct communication by a User Equipment (UE).

Discussion of the Related Art

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system.

SUMMARY OF THE INVENTION

An aspect of the present disclosure is to provide a method for performing Public Land Mobile Network (PLMN) selection related to Proximity-based Service (ProSe) direct communication by a User Equipment (UE).

It will be appreciated by persons skilled in the art that the objects that could be achieved with the present disclosure are not limited to what has been particularly described hereinabove and the above and other objects that the present disclosure could achieve will be more clearly understood from the following detailed description.

An embodiment of the present disclosure provides a method for performing Public Land Mobile Network (PLMN) selection related to Proximity-based Service (ProSe) direct communication by a User Equipment (UE) in a wireless communication system. The method includes selecting a first PLMN, registering with the first PLMN, and if the registration with the first PLMN is failed, selecting a second PLMN. When the UE selects the second PLMN, the UE treats the first PLMN as included in a list that did not include the first PLMN at a time of selecting the first PLMN.

An embodiment of the present disclosure provides a UE for performing PLMN selection related to ProSe direct communication in a wireless communication system. The UE includes a transceiver and a processor. The processor selects a first PLMN, registers with the first PLMN, and if the registration with the first PLMN is failed, selects a second PLMN. When the UE selects the second PLMN, the UE treats the first PLMN as included in a list that did not include the first PLMN at a time of selecting the first PLMN.

The treating of the first PLMN as included in a list that did not include the first PLMN may be to exclude the first PLMN in selecting the second PLMN.

If the registration with the first PLMN is failed, the UE may remember the first PLMN as a PLMN with which the UE has failed in registering.

The registration with the first PLMN may further include transmitting a location registration request to the first PLMN.

The UE may recognize failure in the registration with the first PLMN by receiving a response to the location registration request.

The response to the location registration request may include information about a cause of registration rejection.

The information about the cause may indicate 'PLMN not allowed'.

According to the present disclosure, a UE can select a PLMN effectively.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
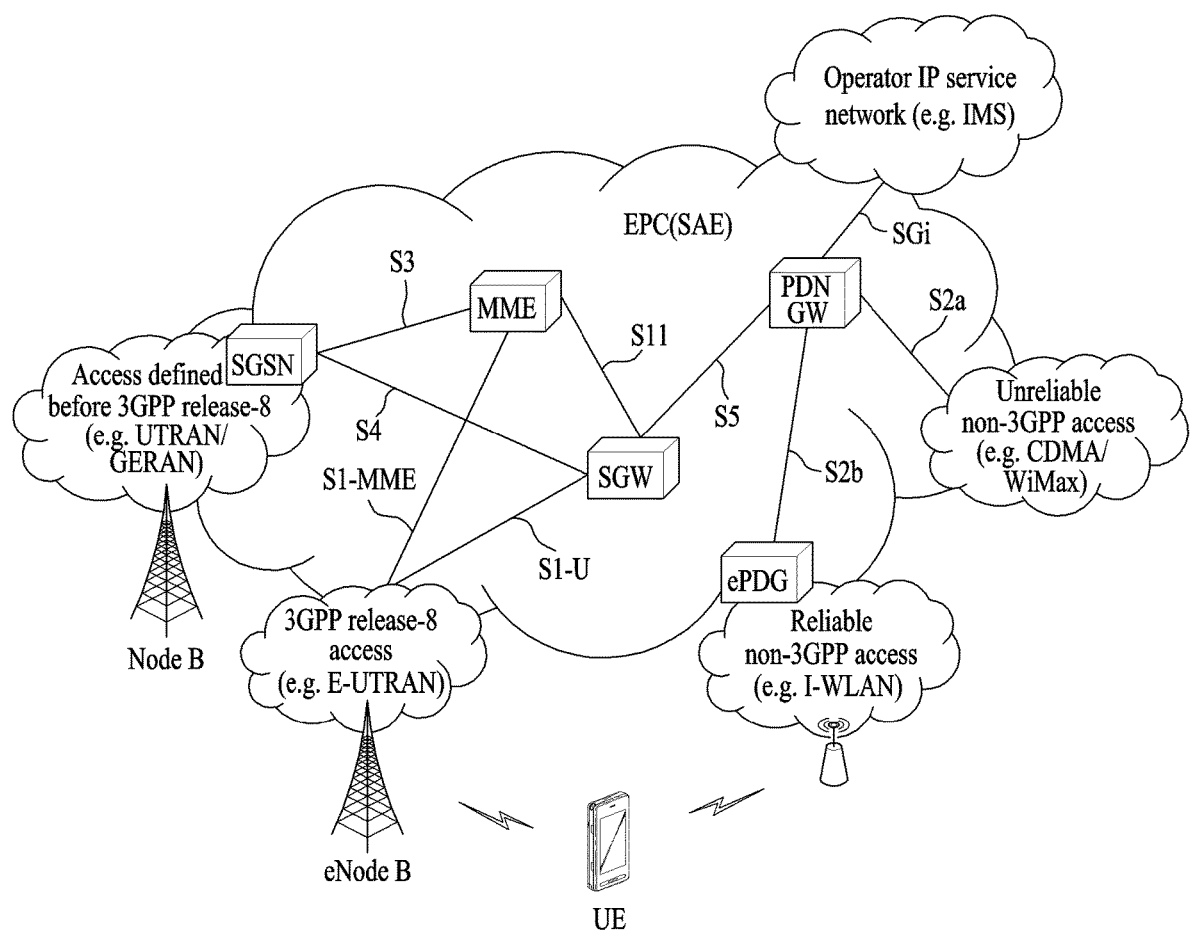
FIG. 1 is a schematic view illustrating the structure of an Evolved Packet System (EPS) including an Evolved Packet Core (EPC)

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

Specific terms used for the embodiments of the present disclosure are provided to help in understanding of the present disclosure. These specific terms may be replaced with other terms within the scope and spirit of the present disclosure.

In some instances, to prevent the concept of the present disclosure from being ambiguous, structures and apparatuses of the known art will be omitted, or will be shown in block diagram form based on main functions of each structure and apparatus. In addition, wherever possible, like reference numerals denote the same parts throughout the drawings and the specification.

The embodiments of the present disclosure may be supported by standard documents disclosed for at least one of wireless access systems including Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present disclosure can be supported by these specifications. Further, all terms as set forth herein can be explained by the standard specifications.

Techniques described herein may be used in various wireless access systems. For clarity, the present disclosure focuses on 3GPP LTE and LTE-A systems. However, the technical features of the present disclosure are not limited thereto.

Terms used in the present disclosure are defined as follows.

UMTS (Universal Mobile Telecommunication System): 3rd generation mobile communication technology based on a Global System for Mobile Communication (GSM) developed by 3GPP.

EPS (Evolved Packet System): Network system including an Evolved Packet Core (EPC) which is a Packet Switched (PS) core network based on Internet Protocol (IP) and an access network such as LTE/UTRAN, which is evolved from UMTS.

NodeB: Base station of a GERAN/UTRAN, which is installed outdoors and has a coverage corresponding to a macro cell.

eNodeB: Base station of E-UTRAN, which is installed outdoors and has a coverage corresponding to a macro cell.

UE (User Equipment): UE can also be referred to as a terminal, a Mobile Equipment (ME), a Mobile Station (MS) or the like. In addition, the UE can be a portable device such as a laptop computer, a mobile phone, a Personal Digital Assistant (PDA), a smartphone or a multimedia device, or a non-portable device such as a Personal Computer (PC) or a vehicle-mounted device. In MTC, the term "UE" or "terminal" may refer to an MTC device.

HNB (Home NodeB): Base station of a UMTS network, which is installed outdoors and has a coverage corresponding to a macro cell.

HeNB: Base station of an EPS network, which is installed outdoors and has a coverage corresponding to a macro cell.

MME (Mobility Management Entity): Network node of an EPS network, which performs Mobility Management (MM) and Session Management (SM).

PDN-GW (Packet Data Network-Gateway)/P-GW: Network node of an EPS network, which performs UE IP address allocation, packet screening and filtering, charging data collection, etc.

SGW (Serving Gateway): Network node of an EPS network, which performs mobility anchoring, packet routing, idle mode packet buffering, a function of triggering an MME to page a UE, etc.

NAS (Non-Access Stratum): Upper stratum of a control plane between a UE and an MME, which is a functional layer for exchanging signaling and traffic messages between a UE and a core network in an LTE/UMTS protocol stack. Major functions thereof are to support UE mobility and to support a session management procedure for establishing and maintaining an IP connection between a UE and a PDN GW.

PDN (Packet Data Network): Network on which a server supporting a specific service (e.g., MMS (Multimedia Messaging Service) server, WAP (Wireless Application Protocol) server or the like) is located.

PDN connection: Logical connection between a UE and a PDN, represented by a single IP address (e.g., single IPv4 address and/or single IPv6 prefix).

RAN (Radio Access Network): Unit including a NodeB, an eNodeB and a Radio Network Controller (RNC) for controlling the NodeB and the eNodeB in a 3GPP network, which is present between UEs and provides a connection to a core network.

HLR (Home Location Register)/HSS (Home Subscriber Server): Database having subscriber information in a 3GPP network. The HSS can perform functions such as configuration storage, identity management and user state storage.

PLMN (Public Land Mobile Network): Network configured for the purpose of providing mobile communication services to individuals. This network can be configured per operator.

Proximity Service (or ProSe Service or Proximity-based Service): Service of enabling discovery and direct communication between physically adjacent devices, communication through an eNB, or communication through a third device. User-plane data is exchanged through a direct data path without passing through a 3GPP core network (e.g., EPC).

ProSe communication: Communication through a ProSe communication path between two or more ProSe-enabled UEs. Unless otherwise mentioned, ProSe communication may mean one of ProSe E-UTRA communication, ProSe-assisted WLAN direction communication between two UEs, ProSe group communication, and ProSe broadcast communication.

ProSe E-UTRA communication: ProSe communication in a ProSe E-UTRA communication path.

ProSe-assisted WLAN direction communication: ProSe communication in a direct communication path.

ProSe communication path: A communication path supporting ProSe communication. The ProSe E-UTRA communication path may be established between ProSe-enabled UEs or through a local eNB, using E-UTRA. The ProSe-assisted WLAN direction communication path may be established directly between ProSe-enabled UEs using a WLAN.

EPC path (or infrastructure data path): A user-plane communication path through an EPC.

ProSe discovery: A process of identifying/determining an adjacent ProSe-enabled UE using an E-UTRA.

ProSe Group Communication: One-to-many ProSe communication using a common communication path, between two or more adjacent ProSe-enabled UEs.

ProSe UE-to-Network Relay: A ProSe-enabled public safety UE operating as a communication relay between a ProSe-enabled network using an E-UTRA and a ProSe-enabled public safety UE.

ProSe UE-to-UE Relay: A ProSe-enabled public safety UE operating as a communication relay between two or more ProSe-enabled public safety UEs.

Remote UE: A ProSe-enabled public safety UE connected to an EPC network, that is, receiving a PDN connection through a ProSe UE-to-Network Relay without being serviced by an E-UTRAN in a UE-to-Network Relay operation, and a ProSe-enabled public safety UE communicating with another ProSe-enabled public safety UE through a ProSe UE-to-UE Relay in a UE-to-UE Relay operation.

ProSe-enabled Network: A network supporting ProSe discovery, ProSe communication, and/or ProSe-assisted WLAN direct communication. Hereinafter, a ProSe-enabled network may be referred to shortly as a network.

ProSe-enabled UE: A UE supporting ProSe discovery, ProSe communication, and/or ProSe-assisted WLAN direct communication. Hereinafter, a ProSe-enabled UE or a ProSe-enabled public safety UE may be referred to shortly as a UE.

Proximity: satisfying a proximity decision criterion defined for each of discovery and communication.

SLP (SUPL Location Platform): An entity responsible for location service management and position determination. The SLP includes a SUPL Location Center (SLC) function and a SUPL Positioning Center (SPC) function. For details, refer to an Open Mobile Alliance (OMA) standard document, OMA AD SUPL: "Secure User Plane Location Architecture".

USD (User Service Description): The Application/service layer includes information about a Temporal Mobile Group Identity (TMGI) for each MBMS service, the starting time and ending time of a session, frequencies, MBMS service area identifies (MBMS SAIs) belonging to an MBMS service area, and so on in USD, and transmits the USD to a UE. For details, refer to 3GPP TS 23.246.

ISR (Idle mode Signalling Reduction): If a UE frequently moves between an E-UTRAN and a UTRAN/GERAN, the resulting repeated location registration procedures cause network resource waste. To reduce the network resource waste, if the UE is in idle mode, the UE registers a location to each of an MME and an SGSN (hereinafter, referred to as mobility management nodes) via the E-UTRAN and the UTRAN/GERAN, and then if the UE moves between already registered RATs (Radio Access Technologies) or performs cell reselection, the UE does not register a location additionally. Therefore, if Downlink (DL) data for the UE arrives, the UE is successfully detected by paging both of the E-UTRAN and the UTRAN/GERAN and data is transmitted to the UE [refer 3GPP TS 23.401 and 3GPP TS 23.60].

Evolved Packet Core (EPC)

FIG. 1 is a schematic view illustrating the structure of an Evolved Packet System (EPS) including an Evolved Packet Core (EPC).

The EPC is a core element of System Architecture Evolution (SAE) for improving the performance of 3GPP technology. SAE is a research project for determining a network structure supporting mobility between various types of networks. For example, SAE aims to provide an optimized packet-based system for supporting various radio access technologies and providing an enhanced data transmission capability.

Specifically, the EPC is a core network of an Internet Protocol (IP) mobile communication system for 3GPP LTE and can support real-time and non-real-time packet-based services. In legacy mobile communication systems (i.e. 2nd Generation (3G) or 3rd Generation (3G) mobile communication systems), the functions of a core network are implemented through a Circuit-Switched (CS) sub-domain for voice and a Packet-Switched (PS) sub-domain for data. However, in a 3GPP LTE system evolved from the 3G communication system, the CS and PS sub-domains are unified into one IP domain. That is, in 3GPP LTE, a connection between terminals having IP capability may be established through an IP-based Base Station (BS) (e.g., an evolved Node B (eNodeB)), EPC, and an application domain (e.g., IP Multimedia Subsystem (IMS)). That is, the EPC is an essential structure for implementation of end-to-end IP services.

The EPC may include various components. FIG. 1 illustrates some of the components, namely, a Serving GateWay (SGW), a Packet Data Network GateWay (PDN GW), a Mobility Management Entity (MME), a Serving GPRS Supporting Node (SGSN), and an enhanced Packet Data Gateway (ePDG).

The SGW operates as a boundary point between a Radio Access Network (RAN) and a core network, and maintains a data path between an eNodeB and the PDN GW. When a UE moves across an area served by an eNodeB, the SGW functions as a local mobility anchor point. That is, packets may be routed through the SGW for mobility in an evolved UMTS Terrestrial Radio Access Network (E-UTRAN) defined after 3GPP Release-8. In addition, the SGW may serve as an anchor point for mobility in another 3GPP network (a RAN defined before 3GPP Release-8, e.g., UTRAN or Global system for mobile communication (GSM)/Enhanced Data Rates for Global Evolution (EDGE) Radio Access Network (GERAN).

The PDN GW (or P-GW) corresponds to a termination point of a data interface directed to a PDN. The PDN GW may support policy enforcement features, packet filtering, charging support, and the like. In addition, the PDN GW may serve as an anchor point for mobility management for a 3GPP network and a non-3GPP network (e.g., an untrusted network such as an Interworking Wireless Local Area Network (I-WLAN) and a trusted network such as a Code Division Multiple Access (CDMA) or Worldwide interoperability for Microwave Access (WiMax) network).

Although the SGW and the PDN GW are configured as separate gateways in the example of the network structure of FIG. 1, the two gateways may be implemented according to a single gateway configuration option.

The MME is an entity that performs signaling and control functions to support access of a UE to a network connection, network resource allocation, tracking, paging, roaming, and handover. The MME controls control-plane functions related to subscriber management and session management. The MME manages a large number of eNodeBs and performs signaling for selection of a conventional gateway for handover to other 2G/3G networks. In addition, the MME performs functions such as security procedures, terminal-to-network session handling, and idle terminal location management.

The SGSN handles all packet data such as mobility management and authentication of a user for other 3GPP networks (e.g., a GPRS network).

The ePDG serves as a security node for an untrusted non-3GPP network (e.g., an I-WLAN and a Wi-Fi hotspot).

As described above with reference to FIG. 1, a UE having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. [Table 1] lists the reference points illustrated in FIG. 1. Various reference points may exist in addition to the reference points of [Table 1] according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-col located PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
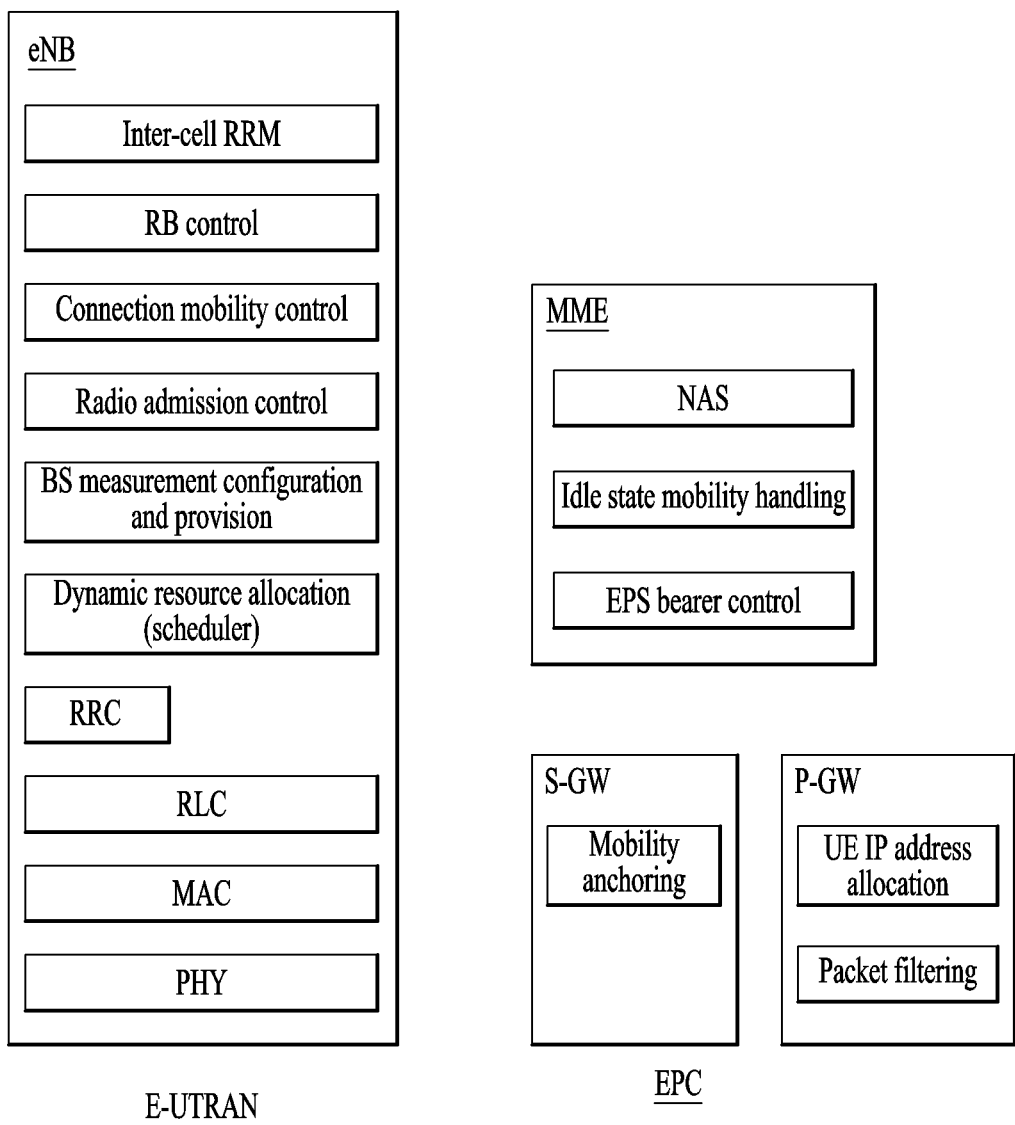
FIG. 2 is an exemplary view illustrating the architecture of a typical Evolved Universal Terrestrial Radio Access Network (E-UTRAN) and EPC.

FIG. 2 is an exemplary view illustrating the architectures of a typical E-UTRAN and EPC.

As illustrated in FIG. 2, while a Radio Resource Control (RRC) connection is activated, an eNodeB may perform routing to a gateway, scheduling transmission of a paging message, scheduling and transmission of a Broadcast Channel (BCH), dynamic allocation of resources to a UE on UL and DL, a configuration and provision for eNodeB measurement, radio bearer control, radio admission control, and connection mobility control. In the EPC, paging generation, LTE_IDLE state management, ciphering of the user plane, SAE bearer control, and ciphering and integrity protection of NAS signaling may be performed.

Figure 3:
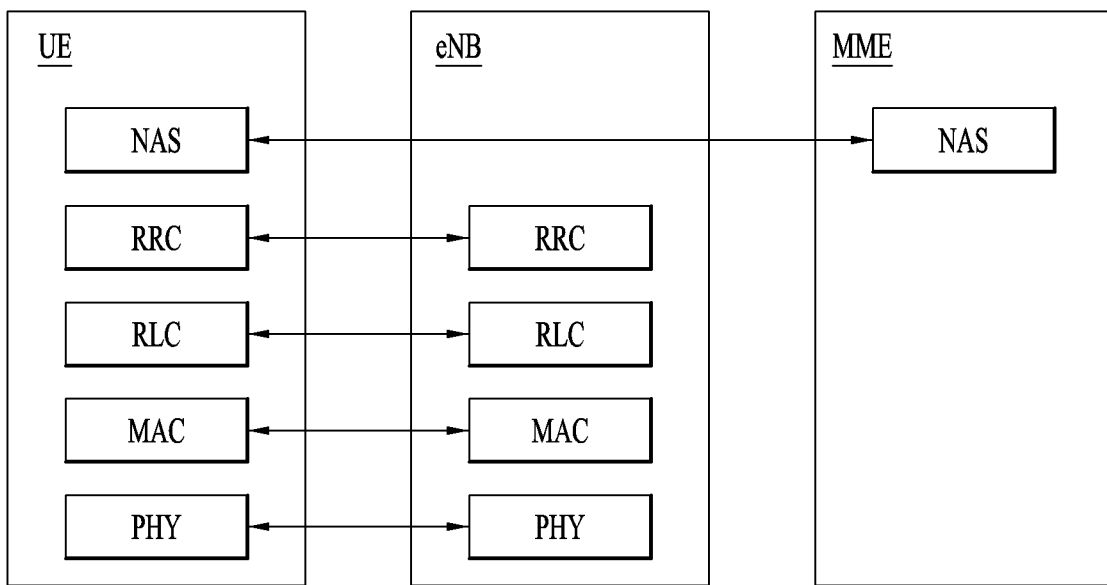
FIG. 3 is an exemplary view illustrating the structure of a radio interface protocol on a control plane.
Figure 4:
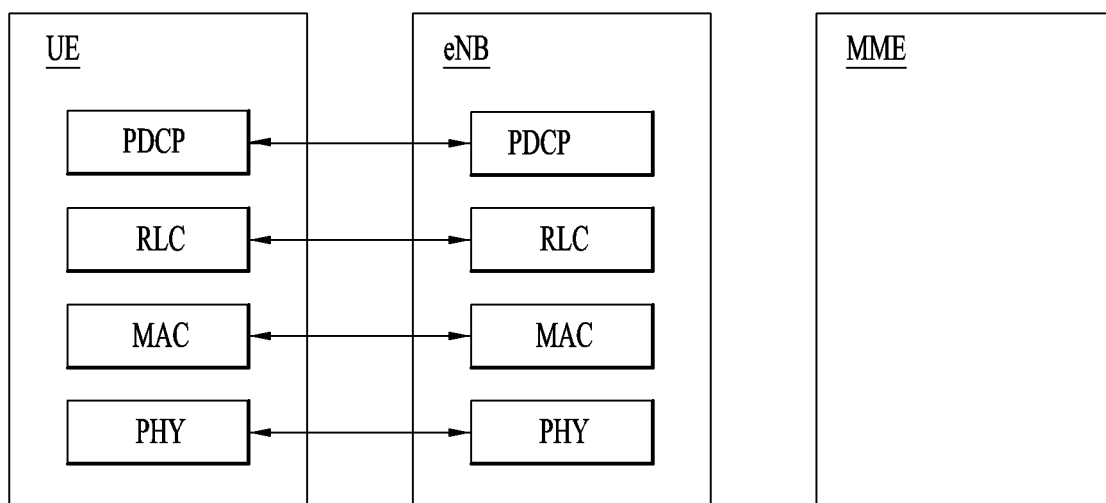
FIG. 4 is an exemplary view illustrating the structure of a radio interface protocol on a user plane.

FIG. 3 is an exemplary view illustrating the structure of a radio interface protocol in a control plane between a UE and an eNB, and FIG. 4 is an exemplary view illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided vertically into a user plane for transmission of data information and a control plane for control signaling.

The protocol layers may be classified into a first layer (L1), a second layer (L2), and a third layer (L3) based on the three sublayers of the Open System Interconnection (OSI) model that is well known in the communication system.

Hereinafter, a description will be given of radio protocol layers in the control plane illustrated in FIG. 3 and radio protocol layers in the user plane illustrated in FIG. 4.

The physical layer at L1 provides an information transfer service using physical channels. The physical channel layer is connected to a Medium Access Control (MAC) layer above the physical layer, through transport channels. Data is transferred between the physical layer and the MAC layer through the transport channels. Transfer of data between different physical layers, i.e., the physical layer of a transmitter and the physical layer of a receiver is performed through the physical channels.

The physical channel includes a plurality of subframes in the time domain and a plurality of subcarriers in the frequency domain. One subframe includes a plurality of symbols in the time domain and a plurality of subcarriers. One subframe includes a plurality of Resource Blocks (RBs). One RB includes a plurality of symbols and a plurality of subcarriers. A unit time for data transmission, Transmission Time Interval (TTI) is 1 ms, which corresponds to one subframe.

According to 3GPP LTE, the physical channels in the physical layers of the transmitter and the receiver may be divided into data channels, Physical Downlink Shared Channel (PDSCH) and Physical Uplink Shared Channel (PUSCH), and control channels, Physical Downlink Control Channel (PDCCH), Physical Control Format Indicator Channel (PCFICH), Physical Hybrid-ARQ Indicator Channel (PHICH) and Physical Uplink Control Channel (PUCCH).

There are a plurality of layers in L2.

First, the MAC layer in L2 serves to map various logical channels to various transport channels, and also serves to multiplex a plurality of logical channels by mapping the logical channels to one transport channel. The MAC layer is connected to its higher layer, Radio Link Control (RLC) through logical channels. The logical channels are divided largely into control channels for transmission of information of the control plane and traffic channels for transmission of information of the user plane according to the types of transmitted information.

The RLC layer in L2 serves to segment and concatenate data received from a higher layer to adjust the size of data such that the size is suitable for a lower layer to transmit the data on a radio link.

The Packet Data Convergence Protocol (PDCP) layer in L2 compresses a header which is relatively large in size and contains unnecessary control information, so that an IP packet such as an IP version 4 (IPv4) or IP version 6 (IPv6) packet may be transmitted efficiently on a radio link having a narrow bandwidth. In addition, in LTE, the PDCP layer also performs security functions including ciphering for preventing a third party from monitoring data, and integrity protection for preventing data manipulation of a third party.

The RRC layer in the uppermost of L3 is defined only in the control plane, and takes charge of controlling the logical channels, transport channels, and physical channels in relation to configuration, reconfiguration, and release of radio bearers. A radio bearer represents a service provided by L2 to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, a description will be given of the RRC state of the UE and an RRC connection method. The RRC state refers to a state in which the RRC of the UE is or is not logically connected with the RRC of the E-UTRAN. The RRC state of the UE having a logical connection with the RRC of the E-UTRAN is referred to as an RRC_CONNECTED state. The RRC state of the UE which does not have a logical connection with the RRC of the E-UTRAN is referred to as an RRC_IDLE state. A UE in the RRC_CONNECTED state has an RRC connection, and thus the E-UTRAN may recognize the presence of the UE on a cell basis. Accordingly, the UE may be effectively controlled. On the other hand, the E-UTRAN cannot recognize the presence of a UE which is in the RRC_IDLE state. The UE in the RRC_IDLE state is managed by a core network on a Tracking Area (TA) basis, a TA being an area unit larger than a cell. That is, for the UE in the RRC_IDLE state, only the presence or absence of the UE is recognized in an area unit larger than the cell. In order for the UE in the RRC_IDLE state to be provided with a usual mobile communication service such as a voice service and a data service, the UE should transition to the RRC_CONNECTED state. Each TA is identified by a Tracking Area Identity (TAI). A UE may configure a TAI through a Tracking Area Code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The Non-Access Stratum (NAS) layer positioned over the RRC layer performs functions such as session management and mobility management.

Hereinafter, the NAS layer shown in FIG. 3 will be described in detail.

The evolved Session Management (eSM) belonging to the NAS layer performs functions such as default bearer management and dedicated bearer management to control a UE to use a PS service from a network. The UE is assigned a default bearer resource by a specific PDN when the UE initially accesses the PDN. In this case, the network allocates an available IP to the UE to allow the UE to use a data service. The network also allocates Quality of Service (QoS) of a default bearer to the UE. LTE supports two kinds of bearers. One bearer is a bearer having characteristics of Guaranteed Bit Rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an Evolved Packet Service (EPS) bearer. When the EPS bearer is allocated to the UE, the network assigns one ID. This ID is called an EPS bearer ID. One EPS bearer has QoS characteristics of a Maximum Bit Rate (MBR) and/or a (GBR).

Figure 5:
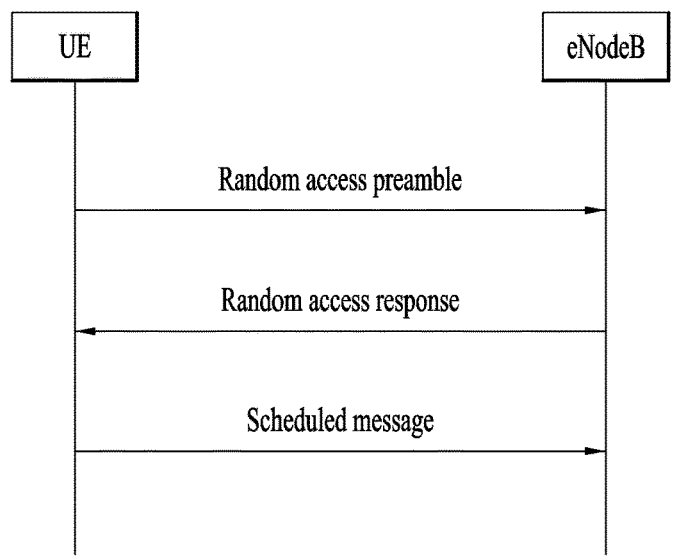
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a Physical Random Access Channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a Random Access Response (RAR) to the UE. The RAR is detected in two steps. First, the UE detects a PDCCH masked with a Random Access (RA)-RNTI. The UE receives an RAR in a MAC Protocol Data Unit (PDU) on a PDSCH indicated by the detected PDCCH.

Figure 6:
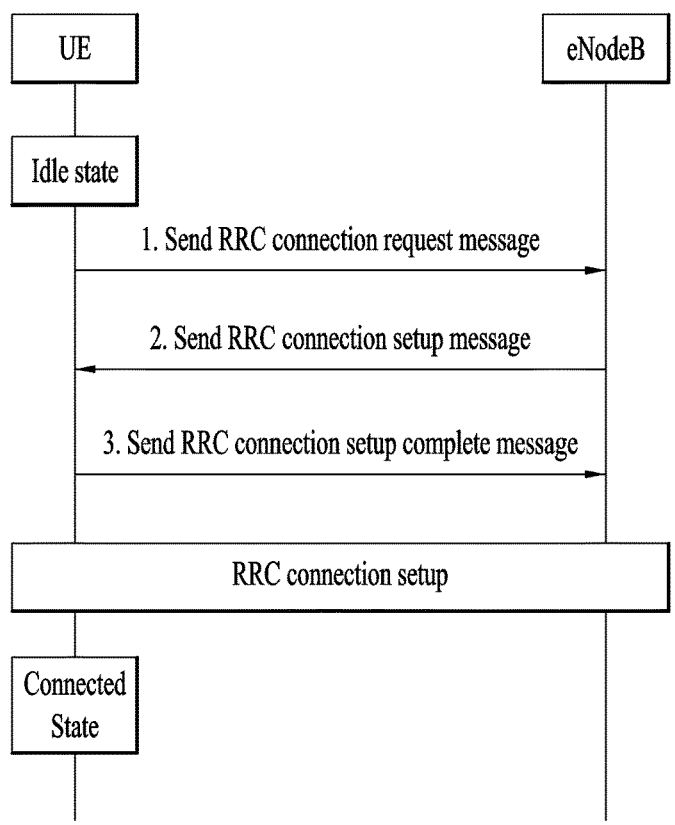
FIG. 6 is a view illustrating a connection procedure in a Radio Resource Control (RRC) layer.
Figure 7:
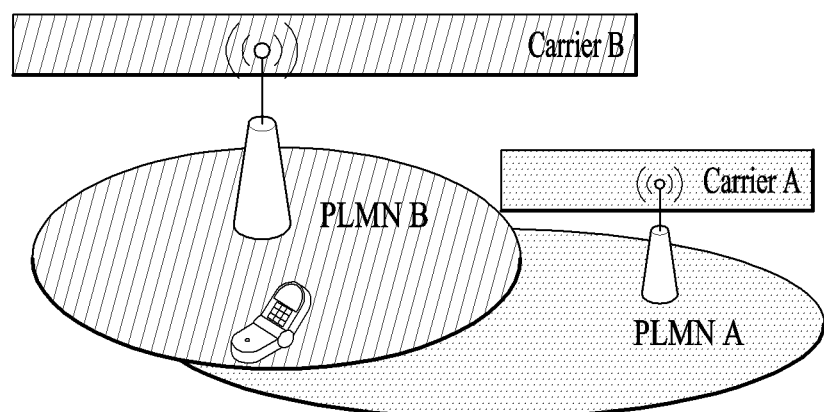
FIG. 7 is a view illustrating a problem which may be encountered with Public Land Mobile Network (PLMN) selection.

FIG. 6 illustrates a connection procedure in an RRC layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNodeB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

PLMN (Public Land Mobile Network) Selection

A PLMN may refer to a mobile communication network (a service provider network, e.g., a service provider network identification number), and PLMN selection refers to a procedure/process of selecting a PLMN to be accessed. The NAS of a UE may evaluate information about PLMNs, reported by the AS of the UE, and select a PLMN to which the UE will register from among the PLMNs. In this process, PLMN/RAT priority stored in a User Services Identity Module (USIM) may be used. PLMN selection may be classified into an automatic PLMN selection scheme in which a UE automatically selects an available PLMN from a priority-based PLMN list, and a manual PLMN selection scheme in which a user directly selects a PLMN from a list of PLMNs provided by the AS of the UE. The UE may select a PLMN/RAT and attempt registration with the PLMN/RAT until the UE successfully registers to a selected PLMN/RAT.

Here, the order of PLMNs/RATs (which may be a PLMN list order shown to the UE) may be PLMNs listed in a Home PLMN (HPLMN) or an Equivalent HPLMN (EHPLMN), PLMNs listed in a "User Controlled PLMN Selector with Access Technology", PLMNs listed in an "Operator Controlled PLMN Selector with Access Technology", PLMNs reported by the AS as high-quality PLMNs, or MNs reported by the AS in a descending order of signal quality.

Upon selection of a PLMN, the UE discovers suitable cells from among cells belonging to the PLMN and selects a cell which can provide a suitable service. Specifically, when the NAS layer notifies the AS layer that PLMN selection is required, the AS layer searches corresponding bands and sends a PLMN list to the NAS layer. Then, the NAS layer may select a PLMN by searching PLMNs in the PLMN list according to priority and select a cell which broadcasts the PLMN. This process may be referred to as 'camping on the cell'. The UE may attempt to register with the selected PLMN by sending Location Registration (LR) and attach requests to a suitable cell. If the UE cannot discover a suitable cell or LR is not accepted (rejection response), the UE fails to register with the selected PLMN.

a) When a suitable cell cannot be detected from a selected PLMN, b) when the UE has no SIM, c) when 'PLMN not allowed' is received through a response to LR, d) when 'illegal MS' or 'illegal ME' is received through the response to LR, e) when 'IMSI unknown in HLR' is received, f) in the case of 'GPRS not allowed' when LR of 'GPRS MS attached to GPRS services only' is received, and g) when a Power Saving Mode (PSM) is activated, the UE may be served while being in a limited service state in the selected PLMN. If the UE has a valid SIM and is in the limited service state, the UE searches PLMNs.

Embodiments

A description will be given of PLMN selection related to Proximity-based Service (ProSe) direct communication (PLMN selection triggered by ProSe direct communication) according to an embodiment of the present disclosure on the basis of the above description. In the following description, a UE may be in a limited service state or a normal service state (state in which normal services may be provided, other than the limited service state). In other words, the UE may be in all or some of i) a state in which a UE in the normal service state selects a PLMN in order to start ProSe direct service, ii) a state in which a UE in the limited service state and performing ProSe direct service selects a PLMN, iii) a state in which a UE in the normal service state and performing ProSe direct service selects a PLMN and iv) a state in which a UE in the limited service state selects a PLMN in order to start ProSe direct service. Here, the limited service state in PLMN selection related to ProSe direct communication refers to a) failure to find a suitable cell of the selected PLMN, c) a 'PLMN not allowed' response when an LR is received; and f) a 'GPRS not allowed' response when an LR of a GPRS MS attached to GPRS services only is received.

According to an embodiment of the present disclosure, if a UE is not served by the E-UTRAN (e.g., outside of E-UTRAN coverage, within E-UTRAN coverage but not camped on any cell, within E-UTRAN coverage but camped on a non-E-UTRAN cell, or camped on an E-UTRAN cell not operating on the carrier frequency provisioned for ProSe direct service), the UE determines its location in a geographical area and, when radio parameters are provisioned in the geographical area, selects a radio parameter associated with the geographical area. The UE checks whether the selected radio parameter causes interference to another cell at the current location. If the radio parameter causes interference to another cell, the UE checks whether the other cell satisfies the following conditions. When the cell operates in the provisioned radio resources (i.e., carrier frequency) and does not belong to an RPLMN or an EPLMN, if any of PLMNs reported by the cell is not either the RPLMN or the EPLMN and at least one PLMN is included in the list of authorized PLMNs for ProSe direct communication, the UE performs PLMN selection triggered by ProSe direct communication. When the UE performs PLMN selection triggered by ProSe direct communication, the UE selects candidate PLMNs which become targets of PLMN selection. When all of condition 1) the PLMNs provide radio resources for ProSe direct communication among the PLMNs, condition 2) the PLMNs are included in the list of authorized PLMNs for ProSe direct communication, and condition 3) the PLMNs are not included in lists of "forbidden PLMNs", "forbidden PLMNs for EPS services" and "PLMNs with E-UTRAN not allowed" are satisfied, the corresponding PLMNs become candidate PLMNs. The UE selects one of the candidate PLMNs. The selected PLMN may be referred to as a first PLMN. The UE may register with the first PLMN. If the UE fails in registering with the first PLMN, the UE may select a second PLMN. That is, upon failed registration, the UE performs the PLMN selection procedure again. In this case, when the UE selects the second PLMN, the UE may treat the first PLMN as included in a list in which the first PLMN was not included at the time of selecting the first PLMN. This means that when the UE selects the second PLMN, the UE excludes the first PLMN. In other words, if the UE fails in registering with the first PLMN, the UE remembers the first PLMN as a PLMN with which the UE has failed in registering, and excludes the first PLMN from selection targets/candidates in the next PLMN selection. As a PLMN with which the UE has failed in registering is remembered and excluded in PLMN selection in this manner, inefficiency involved in repetitions of the PLMN procedure may be eliminated. In the conventional operation, if the UE receives a response indicating 'PLMN not allowed', 'GPRS not allowed', or 'EPS service not allowed', the UE stores the corresponding PLMN in a list of 'forbidden PLMNs' or 'forbidden PLMNs for GPRS service'. Since the PLMN belonging to the stored PLMN list is excluded in PLMN selection, the PLMN that provides a rejection cause of 'PLMN not allowed', 'GPRS not allowed', or 'EPS service not allowed' may not be selected again. However, in the case of a rejection cause other than 'PLMN not allowed', 'GPRS not allowed', and 'EPS service not allowed', the corresponding PLMN is not stored separately in the conventional technology. In this case, the UE may select the failed PLMN again. If the UE selects the corresponding PLMN again, the UE may perform signaling to register with the PLMN, may receive the same rejection cause, and thus may not conduct ProSe direct communication in the PLMN. Inefficiency may occur in terms of signaling for registration with the failed PLMN, and the UE may suffer from a latency in ProSe direct communication due to the unnecessary registration attempt.

According to an embodiment of the present invention, the UE does not reselect a PLMN with which LR has been failed. If the UE fails in registering with the selected PLMN during PLMN selection triggered by ProSe direct communication, the UE should continue the PLMN selection by selecting other candidate PLMNs until candidate PLMNs remain.

If the UE supports ProSe direct communication and needs to perform PLMN selection for ProSe direct communication, the UE should select a PLMN and attempt to register with the selected PLMN. In this case, the UE does not select a PLMN with which the UE has failed in LR. If a higher layer still places a request for initiation of ProSe direct communication, the UE should select a PLMN other than the failed PLMN, and register with the selected PLMN.

Meanwhile, the step of registering with the first PLMN may further include searching for a suitable cell in the first PLMN, and transmitting an LR request to the suitable cell. The UE may be aware that it has failed in registering with the first PLMN by receiving a response to the LR. The response to the LR may include information about a cause of registration rejection. The cause information may indicate 'PLMN not allowed.'

Upon receipt of 'PLMN not allowed', 'GPRS services not allowed', or 'EPS service not allowed' along with a reject message from the network during registration, a ProSe direct communication-enabled UE (a UE having ProSe direct communication capabilities) should remember a corresponding PLMN, and remember that ProSe direct communication is possible in the corresponding PLMN in the limited service state. The UE should maintain the memory until a list of 'forbidden PLMNs' or 'forbidden PLMNs for GPRS service' to which the PLMN belongs is deleted or reset.

If the UE receives 'PLMN not allowed', 'GPRS services not allowed', or 'EPS service not allowed' in PLMN A, the UE is capable of ProSe direct communication, but PLMN A is included in the list of 'forbidden PLMNs' or 'forbidden PLMNs for GPRS service'. Then, in the case where after the UE moves to another PLMN or changes a RAT, the UE returns to PLMN A, and PLMN A is still included in the list of 'forbidden PLMNs' or 'forbidden PLMNs for GPRS service', if the UE does not remember that it has received 'PLMN not allowed', 'GPRS services not allowed', or 'EPS service not allowed' in PLMN A, the UE may neither attempt to register with PLMN A nor conduct ProSe direct communication in PLMNA A in the limited service state, because PLMN A is included in the forbidden PLMN list.

Figure 8:
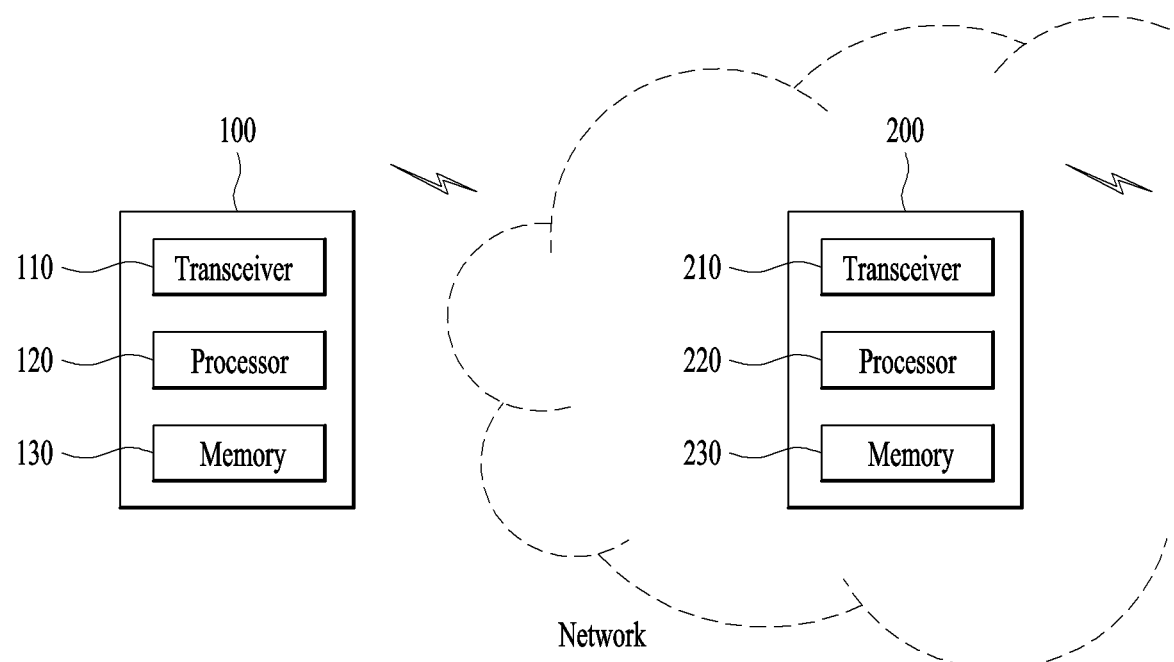
FIG. 8 is a block diagram illustrating the configurations of node devices according to an embodiment of the present disclosure.

FIG. 8 illustrates configurations of a UE and a network node according to an embodiment of the present disclosure.

Referring to FIG. 8, a UE 100 according to the present disclosure may include a transceiver 110, a processor 120 and a memory 130. The transceiver 110 may be configured to transmit signals, data and information to an external device and to receive signals, data and information from the external device. The UE 100 may be connected to the external device in a wired or wireless manner. The processor 120 may control the overall operation of the UE 100 and may be configured to process information transmitted/received between the UE 100 and the external device. In addition, the processor 120 may be configured to perform UE operation proposed by the present disclosure. The memory 130 may store processed information for a predetermined time and may be replaced by a component such as a buffer (not shown).

Referring to FIG. 8, a network node 200 according to the present disclosure may include a transceiver 210, a processor 220 and a memory 230. The transceiver 210 may be configured to transmit signals, data and information to an external device and to receive signals, data and information from the external device. The network node 200 may be connected to the external device in a wired or wireless manner. The processor 220 may control the overall operation of the network node 200 and may be configured to process information transmitted/received between the network node 200 and the external device. In addition, the processor 220 may be configured to perform network node operation proposed by the present disclosure. The memory 230 may store processed information for a predetermined time and may be replaced by a component such as a buffer (not shown).

The aforementioned UE 100 and network node 200 may be implemented such that the above-described various embodiments of the present disclosure are independently applied or two or more thereof are simultaneously applied, and description of redundant parts is omitted for clarity.

The embodiments of the present disclosure may be achieved by various means, for example, hardware, firmware, software, or a combination thereof.

In a hardware configuration, the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

While the above embodiments of the present disclosure have been described based on 3GPP, the embodiments are applicable in the same manner to various mobile communication systems.

What is claimed is:

1. A method for a User Equipment (UE) in a wireless communication system, the method comprising:
    transmitting, by the UE which is outside of coverage, a first message for registration to a first cell on a selected first Public Land Mobile Network (PLMN), wherein the first PLMN is not included in a list related to forbidden PLMNs;
    receiving, by the UE, a second message related to registration failure with the first PLMN;
    selecting, by the UE, a second PLMN; and
    transmitting, by the UE, a third message for registration to a second cell on the selected second PLMN,
    wherein zero or more PLMNs, which are included in the list related to forbidden PLMNs, are excluded in a selection of the second PLMN, and
    wherein the first PLMN with which the registration has failed is further excluded in the selection of the second PLMN, although the first PLMN is not included in the list related to forbidden PLMNs.

2. The method according to claim 1, wherein each of the first message and the third message is a location registration request.

3. The method according to claim 1, wherein the second message includes information about a cause of registration rejection.

4. The method according to claim 3, wherein the information about the cause indicates 'PLMN not allowed'.

5. A User Equipment (UE) of outside of coverage in a wireless communication system, the UE comprising:
    a memory; and
    a processor coupled with the memory,
    wherein the UE transmits a first message for registration to a first cell on a selected first Public Land Mobile Network (PLMN), the first PLMN being not included in a list related to forbidden PLMNs, receives a second message related to registration failure with the first PLMN, selects a second PLMN, and transmits a third message for registration to a second cell on the selected second PLMN,
    wherein zero or more PLMNs, which are included in the list related to forbidden PLMNs, are excluded in a selection of the second PLMN, and
    wherein the first PLMN with which the registration has failed is further excluded in the selection of the second PLMN, although the first PLMN is not included in the list related to forbidden PLMNs.

6. The UE according to claim 5, wherein each of the first message and the third message is a location registration request.

7. The UE according to claim 5, wherein the second message includes information about a cause of registration rejection.

8. The UE according to claim 7, wherein the information about the cause indicates 'PLMN not allowed'.

* * * * *